(12) United States Patent
Kohli et al.

(10) Patent No.: US 8,279,477 B2
(45) Date of Patent: Oct. 2, 2012

(54) PRINT MANAGEMENT SYSTEM AND METHOD BASED ON SERVICE COST

(75) Inventors: Harpreet Singh Kohli, Penfield, NY (US); Kirk Pothos, Webster, NY (US); Peter Cech, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 566 days.

(21) Appl. No.: 12/533,880

(22) Filed: Jul. 31, 2009

(65) Prior Publication Data
US 2011/0026070 A1 Feb. 3, 2011

(51) Int. Cl.
*G06F 3/12* (2006.01)
(52) U.S. Cl. ...... 358/1.15; 358/442; 358/1.13; 358/402; 709/209; 709/220
(58) Field of Classification Search ............... 358/1.15, 358/442, 402, 505, 1.13, 1.14; 709/209, 709/246, 220, 232, 203, 201
See application file for complete search history.

(56) References Cited

U.S. PATENT DOCUMENTS

| | | | |
|---|---|---|---|
| 5,995,721 A | 11/1999 | Rourke et al. ................. 395/114 |
| 6,519,571 B1 * | 2/2003 | Guheen et al. ............. 705/14.66 |
| 6,742,022 B1 | 5/2004 | King et al. ..................... 709/219 |
| 7,079,273 B2 | 7/2006 | Sato .............................. 358/1.15 |
| 7,145,679 B2 | 12/2006 | Hitaka .......................... 358/1.15 |
| 7,161,693 B2 * | 1/2007 | Kizaki et al. ................. 358/1.13 |
| 7,177,034 B2 * | 2/2007 | Nakagawa et al. ........... 358/1.14 |
| 7,266,590 B2 * | 9/2007 | Nakaoka et al. .............. 709/219 |
| 7,270,261 B2 | 9/2007 | Noyama et al. ................ 235/375 |
| 7,281,170 B2 * | 10/2007 | Taylor et al. ..................... 714/48 |
| 7,370,090 B2 * | 5/2008 | Nakaoka et al. .............. 709/219 |
| 7,466,441 B2 | 12/2008 | Barry et al. ................... 358/1.15 |
| 7,595,905 B2 * | 9/2009 | Matsugashita ............... 358/1.15 |
| 7,675,638 B2 * | 3/2010 | Czyszczewski et al. ..... 358/1.14 |
| 7,839,521 B2 * | 11/2010 | Bard et al. ................... 358/1.15 |
| 7,929,165 B2 * | 4/2011 | Bressan et al. ............... 358/1.15 |
| 7,957,019 B2 * | 6/2011 | Swift et al. ................... 358/1.15 |
| 8,073,777 B2 * | 12/2011 | Barry et al. ..................... 705/50 |
| 2004/0218212 A1 * | 11/2004 | Jang et al. .................... 358/1.15 |
| 2005/0212904 A1 | 9/2005 | Uejo .............................. 347/248 |
| 2005/0213132 A1 | 9/2005 | Uejo .............................. 358/1.13 |
| 2006/0087691 A1 * | 4/2006 | Matsugashita ............... 358/1.15 |
| 2006/0176515 A1 * | 8/2006 | Ueda et al. ................... 358/1.15 |
| 2008/0062456 A1 | 3/2008 | Matsunoshita ............... 358/1.15 |
| 2008/0148137 A1 | 6/2008 | Terao et al. ................... 715/200 |
| 2009/0021779 A1 | 1/2009 | Hagiwara ..................... 358/1.15 |
| 2010/0149584 A1 * | 6/2010 | Cech et al. ................... 358/1.15 |

* cited by examiner

*Primary Examiner* — Negussie Worku
(74) *Attorney, Agent, or Firm* — Kermit D. Lopez; Luis M. Ortiz; Tuesday A. Kaasch

(57) ABSTRACT

A print management system and method for optimizing cost associated with one or more rendering devices (e.g., printers) in a customer environment. A service cost associated with a rendering device can be included in the print management system so that end-users can have the option to perform rendering at a lower service cost rendering device when rendering a complex print document. The service cost and the rendered volume can be recorded by an asset management unit and a helpdesk unit. A real time feedback related to an alternate rendering device can be provided so that the end-user can cancel the current print job and resubmit the print document at the lower cost, comparable, reliable rendering device. Also, automatic job redirection can also be provided by automatically redirecting the rendering job to the lower cost reliable rendering device based on end-user approval or pre-approval.

19 Claims, 7 Drawing Sheets

PRINT MANAGEMENT SYSTEM AND METHOD BASED ON SERVICE COST

TECHNICAL FIELD

Embodiments are generally related to rendering devices and techniques. Embodiments also relate in general to the field of computers and similar technologies and, in particular to, software utilized in this field. In addition, embodiments relate to methods and systems for distributing print job(s) based on service cost associated with rendering devices.

BACKGROUND OF THE INVENTION

Service costs associated with rendering devices such as printers can vary depending on the age of the rendering device, wear and tear caused as a result of usage of rendering device components, parts and labor cost, mechanical complexity of the rendering device, and so forth. Every customer environment possesses printers of variable average service cost and end users that perform daily printing operations without knowing printing costs or the availability of printing options that might reduce printing costs. Consequently, end users for printing devices generally use a favorite and a most convenient printer even though their selection can lead to increased printing costs for the enterprise.

Cost of printing is generally charged on basis of price per click, i.e., the price paid per impression generated by the print device. Printing costs are generally fixed in long term contracts signed between the customer and a service company providing the print services. Hence, there is generally no opportunity to change the CPC (cost per click) cost to the customer in between the contract life. Also, it can be difficult to justify to the end users that they must be aware of costs for comparable print devices. Therefore, as it is realized that some print devices can cost more when compared to others in terms of service cost, the service company has no opportunity to perform optimization in order to save money. The service company can wait until print devices with growing higher service cost arrive at a limit of the life term or exceed a threshold of maximum service cost so as to replace the print device with newer print devices. Because of the lack of rendering device optimization, opportunities to save enterprise costs are lost. Consequently, there is a need for a system and method of alerting the end-user regarding the variable service cost associated with comparable print devices to enable the end-user to choose a lower service cost comparable print device in order to reduce the overall rendering cost.

Based on the foregoing, it is believed that a need exists for an improved print management system and method for optimizing cost associated with rendering devices (e.g., printer) in a customer environment. A need also exists for rendering a complex job at a reliable lower service cost comparable printer in order to save overall rendering cost, as described in greater detail herein. There is also a need for a system that can automatically direct print jobs to the most cost competitive rendering device available to an end user based on printing policies that can be set up by the end user or the enterprise.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the present invention to provide for an improved method and system for configuring rendering devices such as printers, scanners, multi-function devices, photocopy machines, and the like in order to optimize rendering device cost savings.

It is another aspect of the present invention to provide for an improved print management system and method for optimizing cost savings associated with the rendering devices in a customer environment.

It is a further aspect of the present invention to provide for a method, system, and computer-usable medium for rendering a complex job at a reliable lower service cost comparable printer to save overall rendering cost.

It is yet a further aspect of the present invention to provide for a method, system, and computer-usable medium for automatically rendering a complex job at a reliable lower service cost comparable printer to save overall rendering cost.

The aforementioned aspects and other objectives and advantages can now be achieved as described herein. A print management system and method for optimizing cost associated with the rendering devices (e.g., printer) in a customer environment is disclosed. A service cost associated with a rending device can be included as a factor in the print management system so that an end-user can perform rendering at a lower service cost rending device when rendering a complex rendering document (e.g., print document). The service cost and a rendered output volume can be recorded by a device management unit and a helpdesk unit. Such units can be managed by an organization that provide print management services, therefore the data can be made available to the print management system to support optimization of service cost based feedback to the end-user.

A real time feedback related to an alternate rendering device can be provided so that the end-user can cancel the current rendering job and resubmit the rendered document to the rendering device that is significantly lower in reliability in terms of service cost, if a comparable (similar capability and/or same model) rendering device is available. Also, an automatic job redirection can also be provided by automatically redirecting the rendering job to the lower cost more reliable rendering device after the end-user approval. The rendering device reliability can be defined as the ability to handle print volume without excessive wear and tear.

Rendering device reliability can be individually calculated among rendering devices of comparable capabilities based on the service cost spent on an individual rendering device for a given print output volume generated by the rendering device. A helpdesk unit manages the rendering device break-fix incidents and records the service cost spent on individual rendering devices. The device management unit can monitor volume rendered by printers and obtain the service cost information for its rendering from the helpdesk unit. The device management unit can provide functionality to manage one or more print policies in order to enable a policy of job redirection. The print capabilities and the print policies data can be made remotely accessible by the device management unit and periodically accessed by print control software optimized to make instant decisions if the end-user needs to be notified regarding the lower service cost rendering device.

Print control software can be configured on a rendering server that communicates with a device management unit to enforce the print policies and calculate alternate rendering device. Print client software can be configured on an end-users workstation to display information regarding the rendering jobs, which can violate the print policies and thus recommend alternate rendering device. The device management unit can recommend an alternate rendering device to the end-user when the rendering job violates the print policy and can also recommend or resubmit the rendering job to an alternate rendering device on the end-user's behalf. End-user decisions based on the service cost saving interaction can also be recorded by the system to track how often the print policy is triggered and if there is a change in end-user print behavior towards lower service cost rendering devices.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope of such embodiments.

Figure 1:
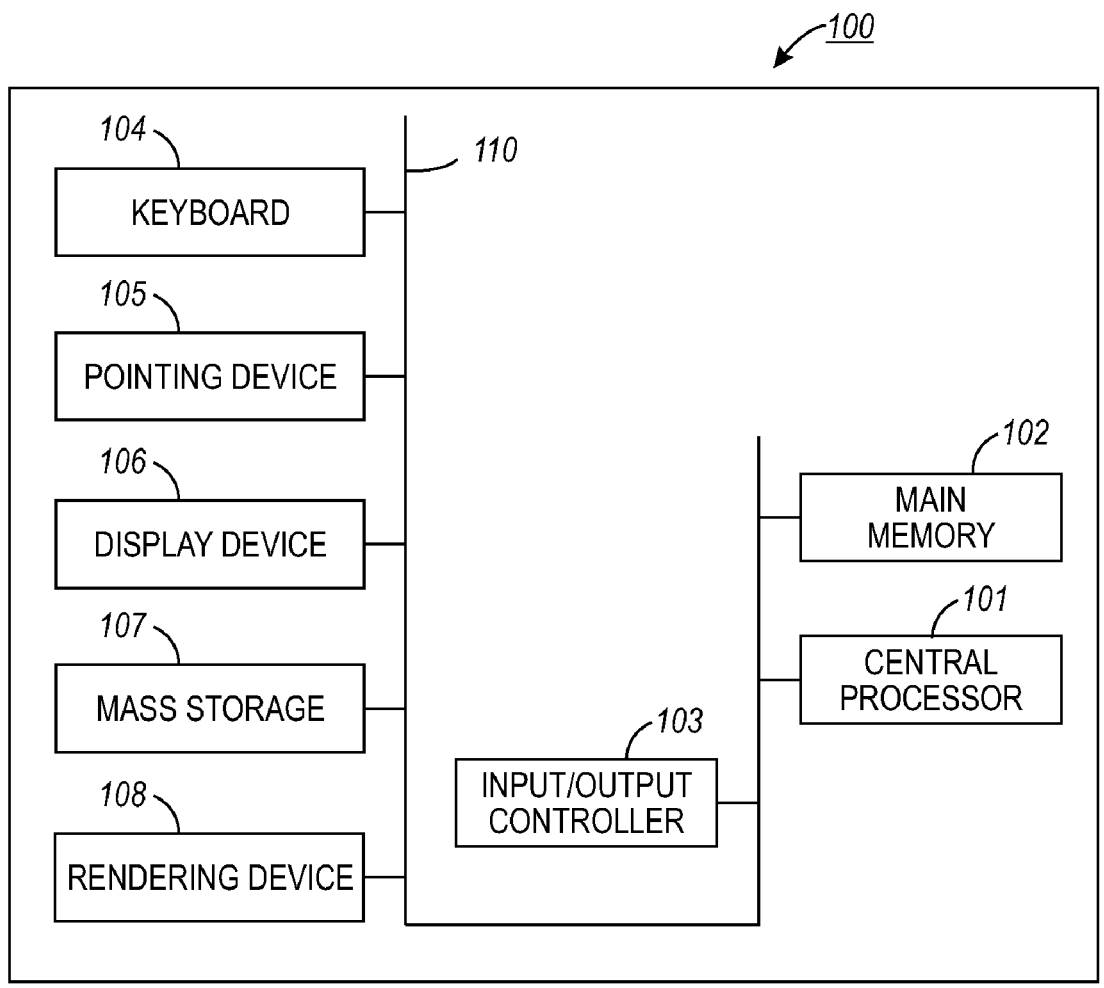
FIG. 1 illustrates a data-processing system in which the present invention can be embodied.
Figure 2:
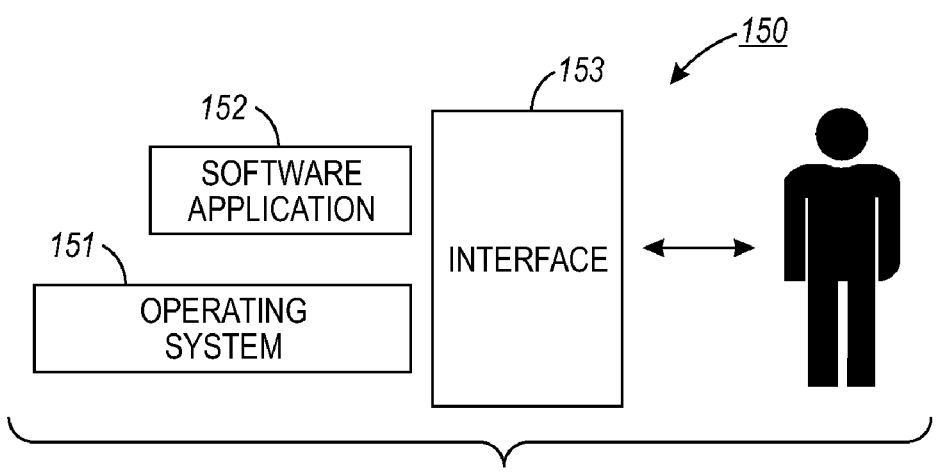
FIG. 2 illustrates a schematic view of a software system including an operating system, application software, and a user interface for carrying out the present invention.
Figure 3:
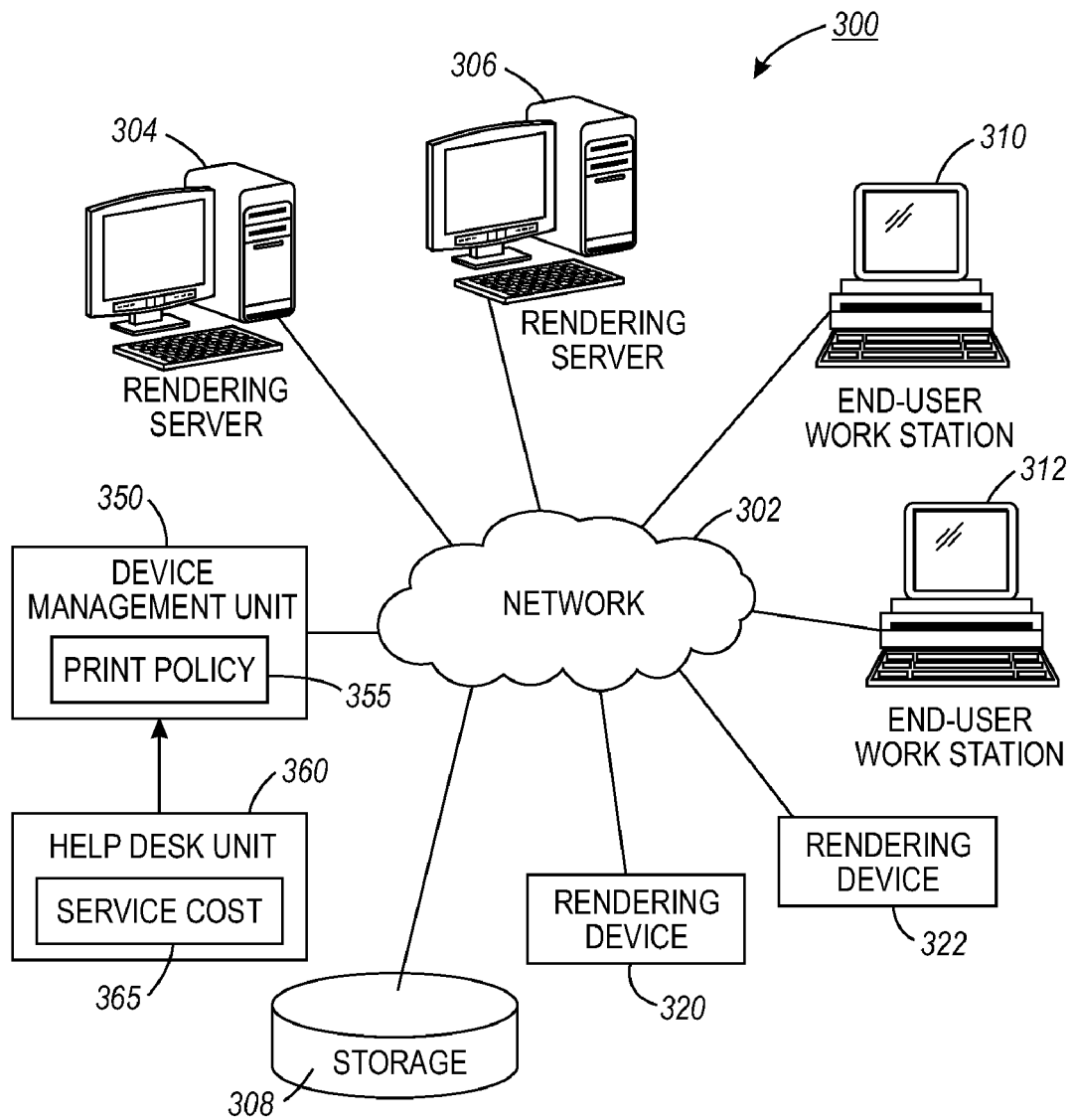
FIG. 3 illustrates a graphical representation of a network of a print management system in which aspects of the present invention can be implemented.

FIGS. 1-3 are provided as exemplary diagrams of data processing environments in which embodiments of the present invention can be implemented. It should be appreciated that FIGS. 1-3 are only exemplary and are not intended to assert or imply any limitation with regard to the environments in which aspects or embodiments of the present invention can be implemented. Many modifications to the depicted environments can be made without departing from the spirit and scope of the present invention.

As depicted in FIG. 1, the present invention can be embodied and/or implemented in the context of a data-processing system 100 that generally includes a central processor 101, a main memory 102, an input/output controller 103, an input device such as, for example, a keyboard 104, a pointing device 105 (e.g., mouse, track ball, pen device, or the like), a display device 106, and a mass storage 107 (e.g., hard disk). Additional input/output devices, such as a rendering device 108, can be utilized in association with the data-processing system 100 as desired. As illustrated, the various components of the data-processing system 100 communicate through a system bus 110 or similar architecture.

Illustrated in FIG. 2, a computer software system 150 is provided for directing the operation of the data-processing system 100. Software system 150, which is stored in system memory 102 and on disk memory 107, includes a kernel or operating system 151 and a shell or interface 153. One or more application programs, such as application software 152, can be "loaded" (i.e., transferred from storage 107 into memory 102) for execution by the data-processing system 100. The data-processing system 100 receives user commands and data through user interface 153; these inputs can then be acted upon by the data-processing system 100 in accordance with instructions from operating module 151 and/or application module 152.

The interface 153, which is preferably a graphical user interface (GUI), also serves to display results, whereupon the user can supply additional inputs or terminate the session. In one particular embodiment, operating system 151 and interface 153 can be implemented in the context of a "Windows" system. In another embodiment, operating system 151 and interface 153 can be implemented in the context of other operating systems such as Linux, UNIX, etc. Application module 152, on the other hand, can include instructions, such as the various operations described herein with respect to the various components and modules described herein such as, for example, the method 600 depicted in FIG. 6.

FIG. 3 illustrates a graphical representation of a network of a print management system 300 in which aspects of the present invention can be implemented. Print management system 300 contains network 302, which is the medium used to provide communications links between various rendering devices and computers connected together within network data processing system 100. Network 302 can include connections such as wire, wireless communication links, or fiber optic cables.

In the depicted example, rendering servers 304 and 306 connect to network 302 along with storage unit 308. In addition, end-user workstations 310 and 312 connect to network 302. These end-user workstations 310 and 312 can be, for example, personal computers or network computers. Data-processing system 100 depicted in FIG. 1 can be, for example, an end-user workstation such as end-user workstations 310 and 312. Alternatively, data-processing system 100 can be implemented as a rendering server such as rendering servers 304 and/or 306, depending upon design considerations.

The data-processing system 100 can be utilized to generate a document in an electronic form and to transmit the document (in the form of a rendering job) to one or more rendering devices 320 and 322. Thus, rendering devices 320 and 322 can be a standalone single function device such as a dedicated printer, scanner, copy machine, etc. Preferably, rendering devices 320 and 322 function as a MFD device capable of multiple rendering functions such as printing, copying, scanning, faxing, etc. The rendering devices 320 and 322 receive a rendering job and render the document.

In the depicted example, rendering server 304 provides data such as boot files, operating system images, and applications to end-user workstations 310 and 312. End-user workstations 310 and 312 are clients to rendering server 304 in this example. Print management system 300 can include additional servers, end-user workstations, and other devices not shown. Specifically, end-user workstations 310 and 312 can connect to any member of a network of servers, which provide equivalent content. FIG. 3 is intended as an example and not as an architectural limitation for different embodiments of the present invention.

The following description is presented with respect to embodiments of the present invention, which can be embodied in the context of a data-processing system such as data-processing system 100, computer software system 150, print management system 300, and network 302 depicted respectively FIGS. 1-3. The present invention, however, is not limited to any particular application or any particular environment. Instead, those skilled in the art will find that the system and method of the present invention can be advantageously applied to a variety of system and application software including database management systems, word processors, and the like. Moreover, the present invention can be embodied on a variety of different platforms including Macintosh, UNIX, LINUX, and the like. Therefore, the description of the exemplary embodiments, which follows, is for purposes of illustration and not considered a limitation.

Figure 4:
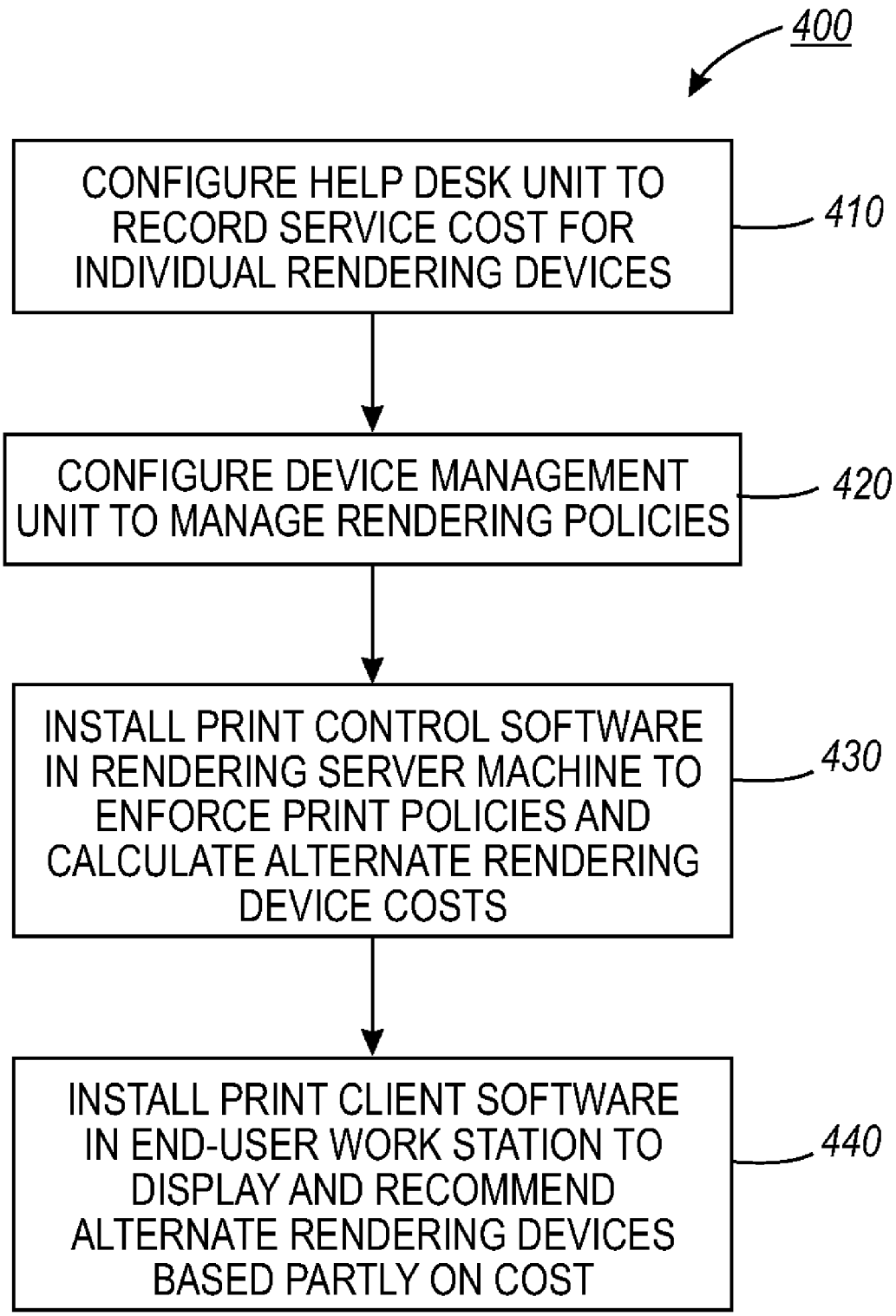
FIG. 4 illustrates a flow chart of operations illustrating logical operational steps of a method for configuring the print management system, in which aspects of the present invention can be implemented.

FIG. 4 illustrates a flow chart of operations illustrating logical operational steps of a method 400 for configuring the print management system 300, in which aspects of the present invention can be implemented. Note that in FIGS. 1-8, identical or similar parts are generally indicated by identical reference numerals. The print management system 300 is configured to further include a helpdesk unit 360 in order to manage break-fix incidents associated with the rendering devices 320 and 322 and records a service cost 365 spent on individual rendering devices 320 and 322, as depicted at block 410. The helpdesk unit 360 can be utilized to transfer the information related to the average service cost per rendering device 320 and 322 to a device management unit 350. The device management unit 350 can be configured to monitor volume rendered, manage rendering policies 355, and obtain the service cost information from the helpdesk unit 360, as indicated at block 420. The help desk unit 360 can be installed onsite, i.e. in the customer environment. However, such help desk unit 360 can also be offsite to provide the required functionality.

The device management unit 350 installed onsite can be responsible for discovering the rendering devices 320 and 322 and the rendering capabilities such as, for example, duplex capable, color capable, printer speed, printer location, etc. Also, the device management unit 350 is capable of providing functionality to manage the rendering policies 355. For example, a policy of job redirection can be enabled if an end-user prints a document over 100 pages and a comparable alternate rendering device with a difference of at least $200 less service cost is available.

Job redirection policies 355 can be enabled based on a difference between the service cost 365 in comparable rendering devices 320 and 322, and size of print documents associated with a number of rendering jobs. The service cost savings based policies 355 can be created based on the number of pages related to the print document so that each and every rendering job is not redirected, thus not keeping the rendering device with higher service cost completely idle. Also, there should be a significant difference in the service cost between the two rendering devices in question. For example, a difference of at least $200 in service cost is significant; otherwise there is not much value of routing print traffic from one rendering device to another. The software application 152 such as, for example, a print control software can be installed in the rendering server machine 304 and 306 to enforce rendering policies 355 and calculate alternate rendering devices, as illustrated at block 430. The rendering control software that runs on the rendering servers 304 and 306 communicates with the device management unit 350 to enforce rendering policies.

The rendering capabilities and the rendering policies data 355 can be made remotely accessible by the device management unit 350 so that it can be periodically accessed by the print control software in order to make an instant decision if the end-user needs to be notified regarding a lower service cost rendering device. Another software application 152 such as, for example, print client software can be installed on the end-users workstations 310 and 312, as illustrated at block 440. The print client software displays information regarding the rendering jobs, which violates rendering policies 355 and thus recommends an alternate print device. The reliability of the rendering devices 320 and 322 can be defined as the ability to handle print volume without excessive wear and tear. Rendering device reliability can be individually calculated among printers 320 and 322 of comparable capabilities based on the service cost 365 spent on the individual rendering device 320 and 322 for a given print output volume generated by the rendering device 320 and 322.

The service cost 365 associated with the rendering device 320 and 322 can be included as a factor in the print management system 300 so that an end-user can perform rendering at the lower service cost rendering device especially when rendering larger or complex print documents. The service cost 365 and the rendered volume can be recorded by the device management unit 350 and the helpdesk unit 360. The device management unit 350 and the helpdesk unit 360 can be managed by an organization that provides print management services. Hence, the service cost 365 and the rendered volume can be made available to the print management system 300 to support service cost based feedback to the end-users. Real time feedback related to the alternate rendering device can also be provided so that the end-user can cancel the current rendering job and resubmit the print document to the lower cost more reliable rendering device if a comparable (similar capability or same printer model) printer is available. Also, an automatic job redirection can also be provided for rendering at a lower cost more reliable rendering device by automatically redirecting the rendering job after end-user's approval.

Figure 5:
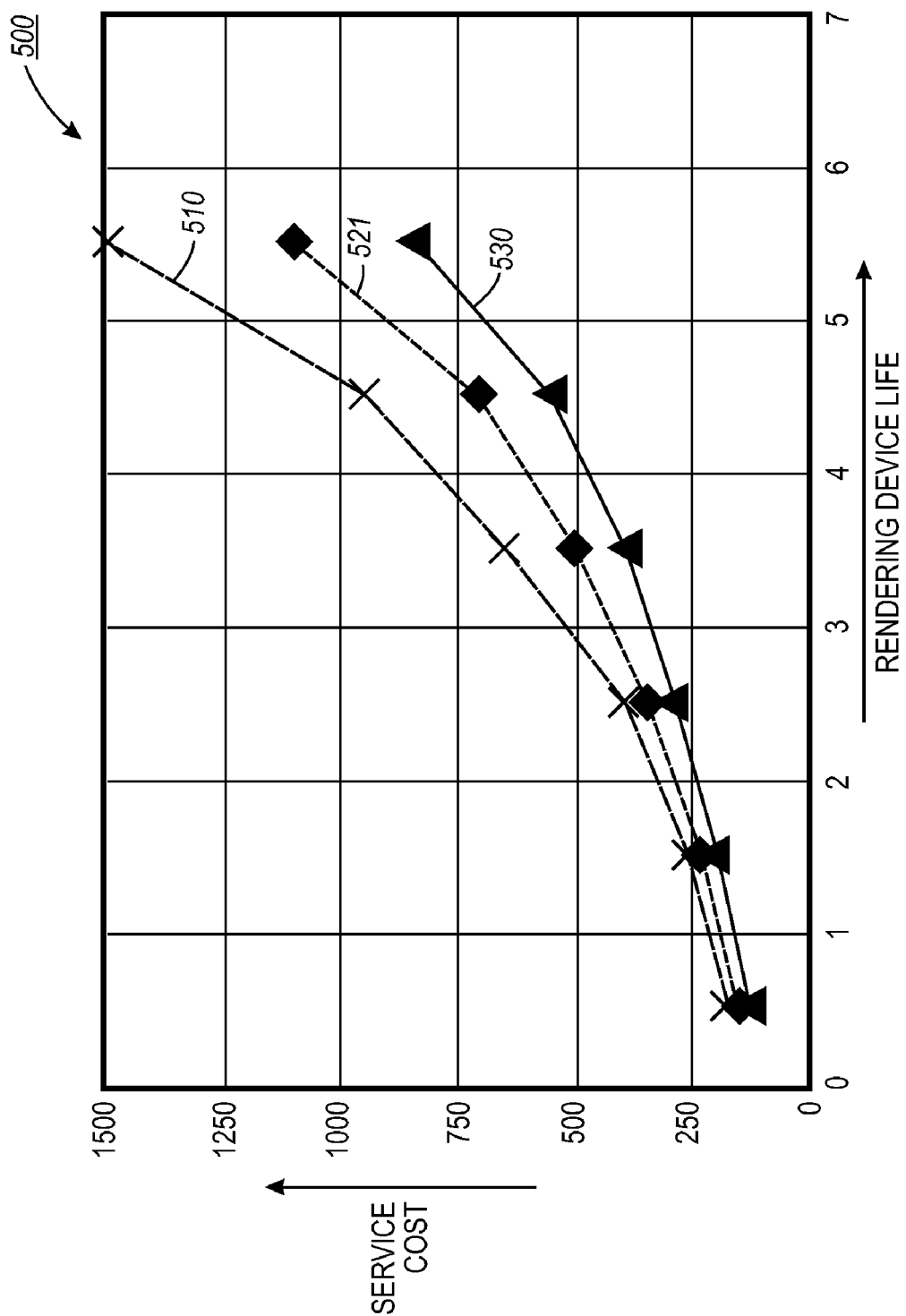
FIG. 5 illustrates a graphical representation depicting printer lifetime service cost for various monthly usage.

FIG. 5 illustrates a graphical representation 500 depicting printer lifetime service costs for various monthly device usage. As shown in FIG. 5, the graph 500 projects a trend on an estimated average service cost for various monthly usage such as, for example, 15K pages per month, 10K pages per month, and 6K pages per month. The curves 510, 521 and 530 depict varying monthly usage for 15K pages per month, 10K pages per month, and 6K pages per month, respectively.

Consider, for an example, two rendering devices 'Phaser ABC' a two years old rendering device and 'Phaser XYZ' a five years old rendering device, which are quite comparable considering the rendering capabilities such as printing speed, color print, duplex, etc. As illustrated in graph 500, if the rendering device ABC print volume varies from 6K-15K, then there is almost negligible difference in yearly service cost because the service cost remains close to $250. In case of rendering device XYZ for given range of 6K-15K, service cost can vary from $525 to $975 (because it is five years old), which means a difference of $450. Such an approach indicates that if the rendering volume can be reduced on XYZ, then a significant cost can be saved. The print management system 300 can control who can print at all or who can print color, how much one can print, and to what rendering devices users have access to in order to save cost. Such solutions can be deployed on the rendering server 304 and 306 and/or end-user workstations 310 and 312 in customer environments. The print management system 300 can intercept the rendering jobs and validate the rendering job against defined print policies.

Figure 6:
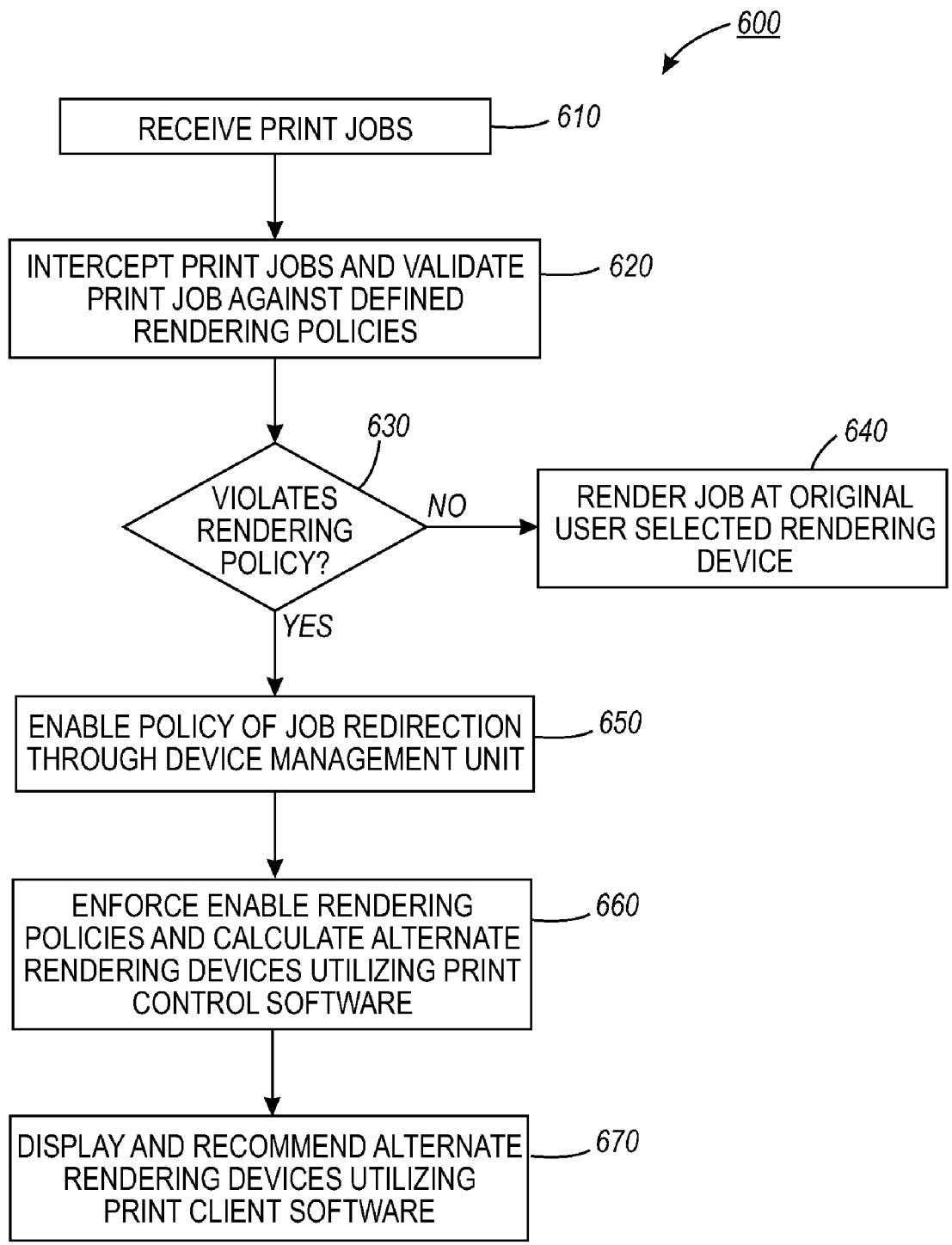
FIG. 6 illustrates a high level flow chart of operations illustrating logical operational steps of a method for optimizing cost associated with the rendering devices in a customer environment, in accordance with a preferred embodiment.

FIG. 6 illustrates a high level flow chart of operations illustrating logical operational steps of a method 600 for optimizing cost associated with the reliable rendering devices 320 and 322 in a customer environment, in accordance with a preferred embodiment. Note that the method 600 can be implemented in the context of a computer-useable medium that contains a program product. The method 600 depicted in FIG. 6 can also be implemented in a computer-usable medium containing a program product.

Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as, but not limited to, Random Access Memory (RAM), and communication media such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention can be implemented by a system having means in the form of hardware, software, or a combination of software and hardware as described herein or their equivalent. Thus, the method 600 described herein can be deployed as process software in the context of a computer system or data-processing system as that depicted in FIGS. 1-3.

The rendering jobs can be received, as illustrated at block 610. The rendering jobs can be intercepted and validated against the defined rendering policies 355, as depicted at block 620. A determination can be made whether the rendering policies 355 are violated, as indicated at block 630. If the rendering policies are violated, a policy of job redirection can be enabled utilizing the device management unit 350, as depicted at block 650. Otherwise, as illustrated at block 640, the job can be rendered at the user's selected rendering device such as rendering device 320 and 322. Next, the enabled print policies 355 can be enforced and an alternate rendering device can be calculated utilizing the print control software installed in the rendering server 302 and 304, as depicted at block 660. The alternate rendering device can be displayed and recommended utilizing the print client software installed in the end-user work station 310 and 312, as shown at block 670.

Figure 7:
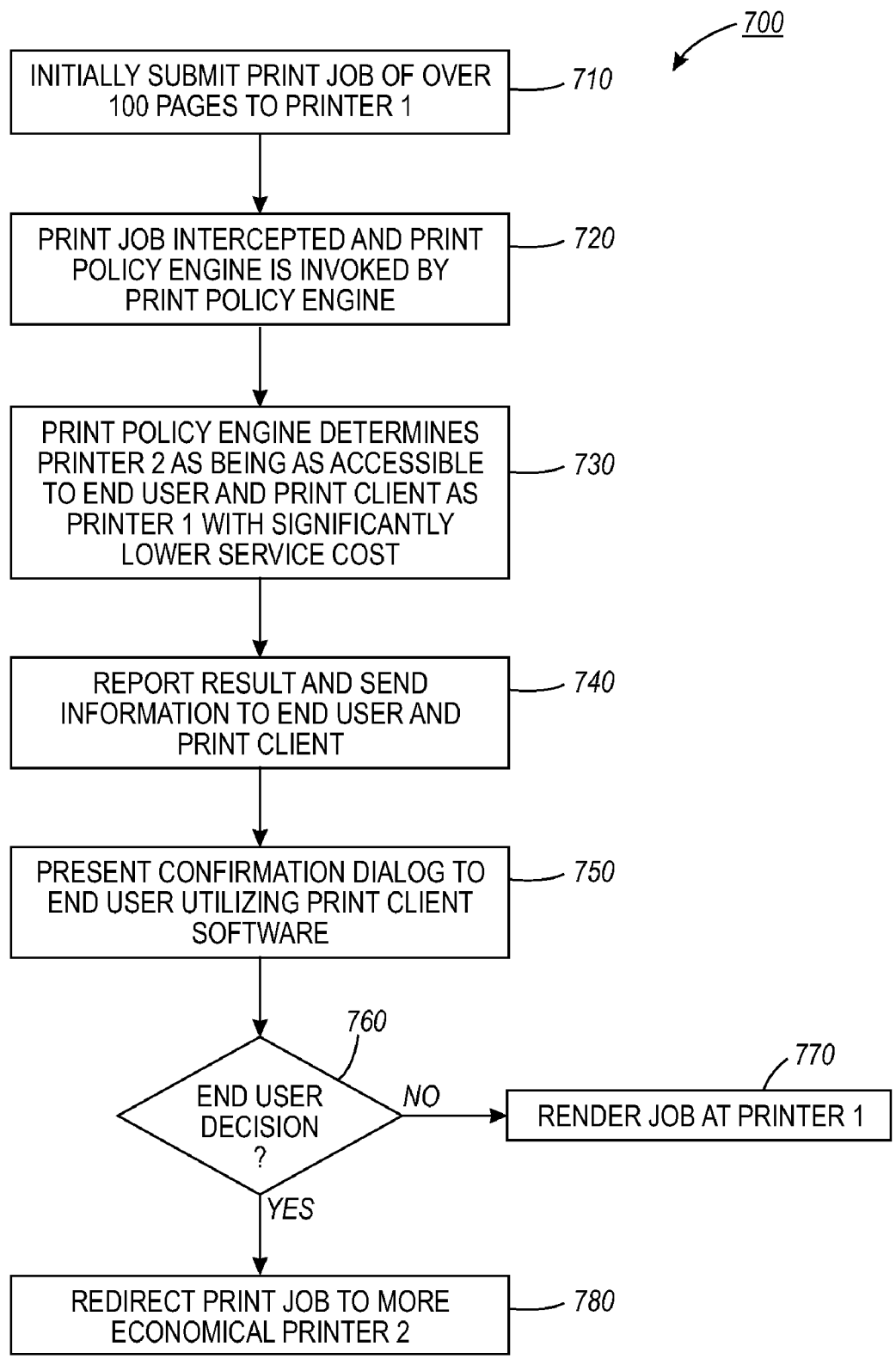
FIG. 7 illustrates a high level flow chart of operations illustrating logical operational steps of a method for rendering complex jobs at a reliable lower service cost comparable rendering device, in accordance with an exemplary embodiment.

FIG. 7 illustrates a high level flow chart of operations illustrating logical operational steps of a method 700 for rendering complex jobs at the reliable lower service cost comparable rendering device, in accordance with an exemplary embodiment. A rendering job comprising 100 pages can be submitted to a 'Printer 1' print device, as depicted at block 710. The rendering control software installed in the rendering server 304 and 306 intercepts the rendering job and invokes the rendering policy 365, as indicated at block 720. The rendering policy 365 then determines that comparable rendering device 'Printer 2' is in the same location 'LX1' with significantly lower service cost, as illustrated at block 730. The result can be reported and sent to the print client software installed in the end-user workstation 310 and 312 from where the rendering job is submitted, as indicated at block 740.

Figure 8:
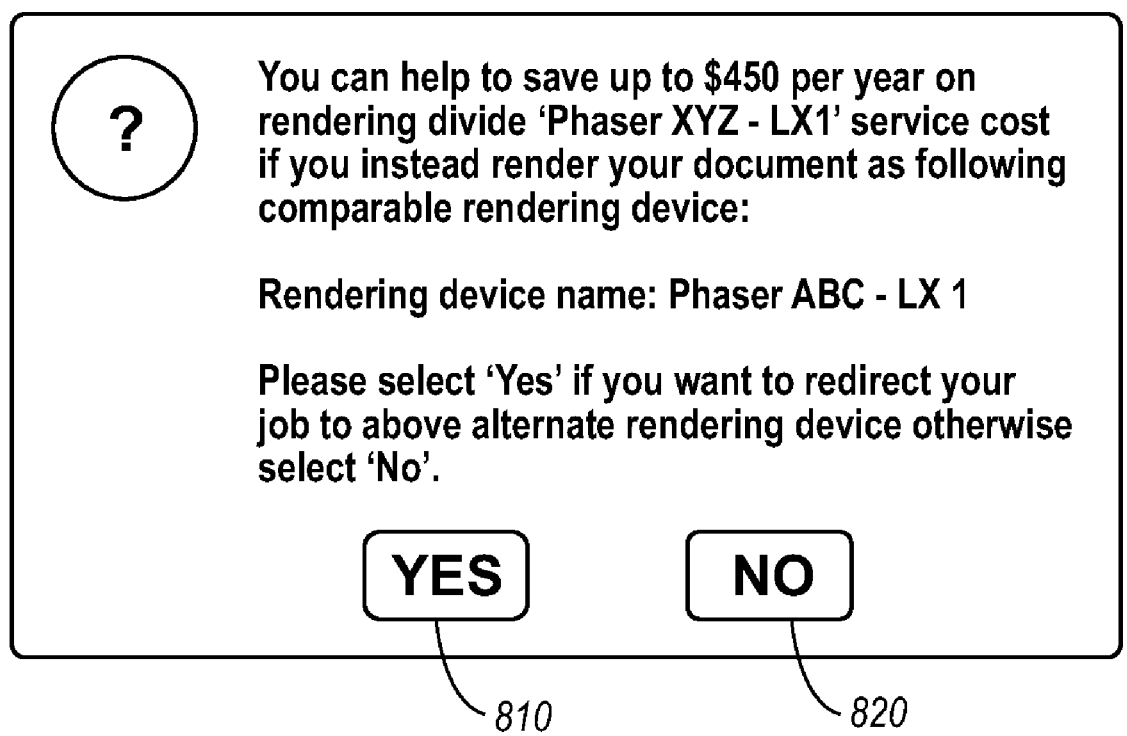
FIG. 8 illustrates an exemplary client side popup dialog box for displaying a lower cost alternative rendering device, in accordance with an exemplary embodiment.

The print client software then presents a confirmation dialog 800 to the end-user, as illustrated at block 750. If the end-user selects 'Yes' button 810 as depicted in FIG. 8, then print control software redirects the rendering job to the more efficient, less expensive 'Printer 2' print device, as depicted at block 780. Otherwise if 'No' button 820 is selected, then the rendering job can be released to continue printing at the original user selected rendering device 'Printer 1', as indicated at block 770. Such an activity of end-user decision based on the service cost saving interaction can also be recorded to track how often a print policy is triggered and if there is a change in end-user rendering behavior towards low service cost rendering devices.

While the present invention has been particularly shown and described with reference to a preferred embodiment, it will be understood by those skilled in the art that various changes in form and detail can be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

It is believed that by utilizing the system and approach described herein, the service cost can be included as a factor in the print management system 300 so that the end-users can be encouraged to perform rendering at lower service cost print devices especially when rendering larger and/or complex rendering documents. The proposed approach can also be adapted for providing an effective print management solution that is capable of recommending or resubmitting rendering job to the alternate rendering device on end-user's behalf.

It will be appreciated that variations of the above-disclosed and other features and functions, or alternatives thereof, can be desirably combined into many other different systems or applications. Also, that various presently unforeseen or unanticipated alternatives, modifications, variations or improvements therein can be subsequently made by those skilled in the art which are also intended to be encompassed by the following claims.

What is claimed is:

1. A method for optimizing cost associated with one or more rendering devices accessible to customers in a customer environment, comprising:

providing a print management system with access to an asset management unit wherein service cost and rendering capabilities for rendering devices are registered;

providing a help desk unit in association with said print management system wherein said help desk unit manages break-fix incidents and records service cost information for each of said rendering devices;

providing a device management unit configured to monitor volume rendered, manage rendering policies and obtain said service cost information from said help desk unit; and enabling customers with the option to perform rendering at a lower cost rendering device identified by the print management system when the customers are rendering complex documents.

2. The method for optimizing cost associated with one or more rendering devices accessible to customers in a customer environment in claim 1, further comprising providing real time feedback to said customer from said device management unit about lower cost rendering device availability.

3. The method for optimizing cost associated with one or more rendering devices accessible to customers in a customer environment in claim 2, wherein a customer is able to cancel a current print job and alternatively resubmit the current print job to said lower cost rendering device.

4. The method for optimizing cost associated with one or more rendering devices accessible to customers in a customer environment in claim 1, wherein said print management system is programmable to automatically redirect documents for rendering at lower cost rendering devices based on one of prior customer approval and enterprise policies.

5. The method for optimizing cost associated with one or more rendering devices accessible to customers in a customer environment in claim 1, further comprising configuring said help desk to enable customer select rendering of documents at a lower cost rendering device when rendering a complex rendering.

6. The method for optimizing cost associated with one or more rendering devices accessible to customers in a customer environment in claim 1, further comprising intercepting jobs in order to thereafter validate said jobs against enterprise printing policies and recommending at least one lower cost rendering device.

7. The method for optimizing cost associated with one or more rendering devices accessible to customers in a customer environment in claim 6, wherein recommending said at least one lower cost rendering device further comprises canceling a job in order to thereafter resubmit said job to said at least one alternate rendering device at the request of a customer.

8. The method for optimizing cost associated with one or more rendering devices accessible to customers in a customer environment in claim 1, wherein recommending said at least one lower cost rendering device further comprises automatically redirecting said rendering job to said lower cost rendering device regardless of approval from said customer.

9. A method for optimizing service cost associated with the selection of a rendering device, comprising:
    configuring a help desk unit to record service cost associated with at least one rendering device and a device management unit to manage at least one print policy wherein said device management unit obtains said service cost information from said helpdesk unit;
    enforcing said at least one print policy utilizing a print control software module installed in a rendering server and finding at least one alternate rendering device based on said service cost; and
    configuring a rendering client software module to display information related to a rendering job that violates said at least one print policy in order to thereafter recommend said at least one alternate rendering device thereby rendering said rendering job at a lower service cost and comparable rendering device and saving on overall rendering costs.

10. The method for optimizing service cost associated with the selection of a rendering device in claim 9, wherein said at least one print policy comprises a rendering job redirection policy.

11. The method for optimizing service cost associated with the selection of a rendering device in claim 9, further comprising installing said rendering client software on a plurality of end-user workstations.

12. The method for optimizing service cost associated with the selection of a rendering device in claim 9, wherein configuring a help desk unit to record a service cost associated with at least one rendering device, further comprises:
    configuring said service cost in order to perform rendering at said lower service cost rendering device when rendering a complex rendering job by an end-user.

13. The method for optimizing service cost associated with the selection of a rendering device in claim 9, further comprising managing said help desk unit and said device management unit by an organization that provides at least one print management service in order to provide said at least one service cost based feedback to said end-user.

14. The method for optimizing service cost associated with the selection of a rendering device in claim 9, further comprising intercepting said rendering job in order to thereafter validate said rendering job against said at least one print policy.

15. The method for optimizing service cost associated with the selection of a rendering device in claim 9, wherein recommending said at least one alternate rendering device, further comprises:
    canceling said rendering job in order to thereafter resubmit aid rendering job to said at least one alternate rendering device by said end-user.

16. The method for optimizing service cost associated with the selection of a rendering device in claim 9, wherein recommending said at least one alternate rendering device, further comprises:
    automatically redirecting said rendering job to said lower service cost comparable rendering device after approval from said end-user.

17. The method for optimizing service cost associated with the selection of a rendering device in claim 9, wherein said configuring said device management unit to remotely access said at least one print policy wherein said at least one print policy periodically accessed by said print control software to make a decision based on a notification regarding said lower service cost rendering device.

18. The method for optimizing service cost associated with the selection of a rendering device in claim 9, further comprising recording said end-user decision based on said at least one service cost saving interaction by said print management system in order to track how often said at least one print policy is triggered.

19. A system for optimizing cost associated with one or more rendering devices accessible to customers in a customer environment, comprising:
    a print management system including electronic access to a device management unit wherein service cost and rendering capabilities for rendering devices are registered; and
    a help desk unit operationally associated with said print management system to facilitate customer access to rendering devices registered with said device management unit through said print management system;
    wherein said print management system and help desk unit enable customers to optionally perform rendering at lower cost rendering devices identified by the device management unit when the customers are rendering complex documents.

* * * * *